Patented Sept. 18, 1934

1,973,918

UNITED STATES PATENT OFFICE 1,973,918

REACTION PRODUCT OF SULPHUR DIOXIDE AND ALDEHYDE DERIVATIVES OF A SCHIFF'S BASE

Deal H. Tompkins, Nitro, W. Va., assignor to The Rubber Service Laboratories Company, Akron, Ohio, a corporation of Ohio No Drawing. Application March 9, 1931, Serial No. 521,385

18 Claims. (Cl. 260—130)

The present invention relates to new chemical substances comprising reaction products obtained by reacting an aldehyde with a Schiff's base, reacting sulphur dioxide therewith and treating the products so formed with an acid. The invention also comprises the process of manufacturing such products.

One of the preferred new compounds, for example sulphuric acid derivative of the reaction product of sulphur dioxide and an aldehyde derivative of a Schiff's base was prepared as follows: Substantially one molecular proportion of the product formed from the reaction of substantially three molecular proportions of acetaldehyde and substantially two molecular proportions of aniline, prepared preferably according to the method set forth in U. S. Patent No. 1,659,152 granted to Clayton Olin North, was dissolved in an organic solvent, for example, a quantity of acetone equal to substantially one-third of the weight of the aldehyde-amine product. Substantially one-half a molecular proportion of sulphur dioxide was passed thereinto at a rate slow enough for complete absorption and combination to take place, while agitating and maintaining a temperature of approximately 30 to 60° C. To the product thus formed, substantially one molecular proportion of sulphuric acid of any desired dilution but preferably having an acid strength of 75% was added at a temperature of substantially 50 to 70° C. After the addition of the sulphuric acid was completed, the water present and the solvent employed, for example acetone, were removed preferably by evaporation. The product prepared in the manner described, after cooling, was a brittle resin.

Other sulphuric acid derivatives of the reaction products of sulphur dioxide and aldehyde derivatives of Schiff's bases as set forth hereinafter have been prepared in a manner analogous to that hereinbefore set forth. Thus, the following compounds, designated Compounds A to G inclusive, were prepared. These compounds represent the sulphuric acid derivatives of the sulphur dioxide reaction product of the following bases:

Compound A.—Substantially three molecular proportions of acetaldehyde and substantially two molecular proportions of ortho-toluidine.

Compound B.—Anhydro-formaldehyde-aniline.

Compound C.—Substantially three molecular proportions of butylaldehyde and substantially one molecular proportion of aniline.

Compound D.—Substantially one molecular proportion of 2,4-diamido-diphenylamine and substantially three molecular proportions of heptaldehyde.

Compound E.—Substantially three molecular proportions of heptaldehyde and substantially one molecular proportion of aniline.

Compound F.—Substantially one molecular proportion of formaldehyde and substantially one molecular proportion of beta-naphthylamine.

Compound G.—Substantially three molecular proportions of butylaldehyde and substantially one molecular proportion of ortho-toluidine.

Another of the preferred new class of compounds, for example, a hydrochloric acid derivative of a reaction product of sulphur dioxide and an aldehyde derivative of a Schiff's base, was prepared in a manner analogous to that described above for the corresponding sulphuric acid derivative. The hydrochloric acid used had preferably an acid strength of approximately 35 to 39%. The product prepared, for example, the reaction product of substantially one molecular proportion of hydrochloric acid and the product formed by reacting substantially one-half a molecular proportion of sulphur dioxide with substantially one molecular proportion of the reaction product of substantially three molecular proportions of acetaldehyde and substantially two molecular proportions of aniline, was a brittle resin.

The corresponding phosphoric and chromic acid derivatives of a sulphur dioxide reaction product of the product formed by reacting substantially three molecular proportions of acetaldehyde and substantially two molecular proportions of aniline were also prepared in a manner analogous to that described above.

Other acid derivatives of a reaction product of sulphur dioxide and Schiff's bases and aldehyde derivatives thereof have been prepared in a manner analogous to that hereinbefore set forth. Thus, the following compounds were so prepared:

Compound H.—Hydrochloric acid reaction product of the sulphur dioxide derivative of anhydro-formaldehyde-aniline.

Compound I.—Hydrochloric acid reaction product of the sulphur dioxide derivative of the reaction product of substantially three molecular proportions of butylaldehyde and substantially one molecular proportion of aniline.

Compound J.—Chromic acid reaction product of the sulphur dioxide derivative of the reaction product of substantially three molecular proportions of acetaldehyde and substantially two molecular proportions of ortho-toluidine.

*Compound K.*—Chromic acid reaction product of the sulphur dioxide derivative of the reaction product of substantially one molecular proportion of beta-naphthylamine and substantially one molecular proportion of formaldehyde.

*Compound L.*—Phosphoric acid reaction product of the sulphur dioxide derivative of the reaction product of substantially one molecular proportion of ortho-toluidine and substantially three molecular proportions of butylaldehyde.

*Compound M.*—Phosphoric acid reaction product of the sulphur dioxide derivative of the reaction product of substantially one molecular proportion of 2,4-diamido-diphenylamine and substantially three molecular proportions of heptaldehyde.

*Compound N.*—Acetic acid reaction product of the sulphur dioxide derivative of the reaction product of substantially one molecular proportion of beta-naphthylamine and substantially one molecular proportion of formaldehyde.

*Compound O.*—Acetic acid reaction product of the sulphur dioxide derivative of anhydro-formaldehyde-aniline.

*Compound P.*—Benzoic acid reaction product of the sulphur dioxide derivative of the reaction product of substantially one molecular proportion of 2,4-diamido-diphenylamine and substantially three molecular proportions of heptaldehyde.

*Compound Q.*—Benzoic acid reaction product of the sulphur dioxide derivative of the reaction product of substantially two molecular proportions of ortho-toluidine and substantially three molecular proportions of acetaldehyde.

*Compound R.*—Oxalic acid reaction product of the sulphur dioxide derivative of the reaction product of substantially one molecular proportion of aniline and substantially three molecular proportions of heptaldehyde.

*Compound S.*—Oxalic acid reaction product of the sulphur dioxide derivative of anhydro-formaldehyde-aniline.

*Compound T.*—Monochloracetic acid reaction product of the sulphur dioxide derivative of the reaction product of substantially one molecular proportion of aniline and substantially one molecular proportion of crotonaldehyde.

*Compound U.*—Formic acid reaction product of the sulphur dioxide derivative of the reaction product of substantially one molecular proportion of beta-naphthylamine and substantially one molecular proportion of formaldehyde.

*Compound V.*—Butyric acid reaction product of the sulphur dioxide derivative of the reaction product of substantially one molecular proportion of beta-naphthylamine and substantially one molecular proportion of formaldehyde.

*Compound W.*—Salicylic acid reaction product of the sulphur dioxide derivative of the reaction product of substantially two molecular proportions of piperidine and substantially one molecular proportion of formaldehyde.

*Compound X.*—Formic acid reaction product of the sulphur dioxide derivative of the reaction product of substantially two molecular proportions of diethylamine and substantially one molecular proportion of formaldehyde.

*Compound Y.*—Sulphanilic acid reaction product of the sulphur dioxide derivative of the reaction product of substantially one molecular proportion of propylamine and substantially one molecular proportion of butylaldehyde.

Reaction products of the preferred class have also been formed from other ratios of acid, sulphur dioxide and aldehyde-amine than those hereinbefore set forth. Thus, substantially one molecular proportion of the product formed by reacting substantially three molecular proportions of acetaldehyde with substantially two molecular proportions of aniline has been reacted with varying amounts of sulphur dioxide, preferably in the ratios between substantially one-fifth to one molecular proportion and the material so prepared further reacted with varying amounts of sulphuric acid, preferably in ratios varying between three-fourths to one and one-half molecular proportions. A compound has also been produced by reacting substantially one molecular proportion of the reaction product of substantially three molecular proportions of acetaldehyde and substantially two molecular proportions of aniline with substantially seven-tenths of a molecular proportion of sulphur dioxide, and further reacting the material so prepared with substantially two molecular proportions of hydrochloric acid. Another compound of the preferred class has been formed by reacting substantially one molecular proportion of the reaction product of substantially three molecular proportions of acetaldehyde and substantially two molecular proportions of aniline with substantially seven-tenths of a molecular proportion of sulphur dioxide, and further reacting the material so prepared with substantially one molecular proportion of acetic acid.

Other solvents than acetone have also been employed in the preparation of the class of compounds hereinbefore described. For example, the sulphuric acid derivative of the reaction product of sulphur dioxide with the material formed from substantially three molecular proportions of acetaldehyde and substantially two molecular proportions of aniline has been prepared in a benzene medium.

Although it is desirable that the preferred new class of substances be prepared in the presence of an organic solvent, as for example acetone, benzene and the like, it is not imperative that a solvent be employed. The sulphur dioxide may be reacted with the aldehyde-amine product without dissolving the latter in a solvent, and the product so formed may be further reacted with an acid, forming a compound of the preferred type.

The new class of compounds as hereinbefore disclosed constitutes an important group of inhibitors, the use of which in the acid pickling of metals is disclosed and claimed in co-pending U. S. patent applications, Serial Nos. 465,070, 487,506, 488,196, 489,240 and 495,519, which on June 2, 1931 matured into Patent Numbers 1,808,184; 1,808,185; 1,808,186; 1,808,187 and 1,808,188 respectively.

What is claimed is:

1. The acid derivatives of a reaction product of sulphur dioxide and an aliphatic aldehyde-amine product.

2. The acid derivatives of a reaction product of sulphur dioxide and an aliphatic aldehyde-aromatic amine reaction product.

3. The acid derivatives of a reaction product of sulphur dioxide and an aliphatic aldehyde derivative of a Schiff's base.

4. The mineral acid derivatives of a reaction product of sulphur dioxide and an aliphatic aldehyde derivative of a Schiff's base.

5. The sulphuric acid derivatives of a reaction product of sulphur dioxide and a material formed by reacting an aliphatic aldehyde containing less than eight carbon atoms with a primary aromatic amine.

6. The sulphuric acid derivatives of a reaction product of sulphur dioxide and a material formed by reacting substantially three molecular proportions of acetaldehyde with substantially two molecular proportions of aniline.

7. The product formed by reacting substantially one-half a molecular proportion of sulphur dioxide with substantially one molecular proportion of the reaction product of substantially three molecular proportions of acetaldehyde and substantially two molecular proportions of aniline and further reacting the product thus formed with substantially one molecular proportion of sulphuric acid.

8. The process of preparing an acid derivative of a reaction product of sulphur dioxide and an aliphatic aldehyde-amine product, which comprises combining sulphur dioxide with said aldehyde-amine at a temperature sufficient to produce reaction and treating the product thus formed with an acid.

9. The process of preparing an acid derivative of a reaction product of sulphur dioxide and an aliphatic aldehyde-amine product, which comprises combining sulphur dioxide with said aldehyde-amine at a temperature of approximately 30 to 60° C. and treating the product thus formed with an acid at a temperature of approximately 50 to 70° C.

10. The process of preparing an acid derivative of a reaction product of sulphur dioxide and an aliphatic aldehyde-aromatic amine reaction product, which comprises combining sulphur dioxide with said aliphatic aldehyde-aromatic amine reaction product at a temperature of approximately 30 to 60° C. and treating the product thus formed with an acid at a temperature of approximately 50 to 70° C.

11. The process of preparing an acid derivative of a reaction product of sulphur dioxide and an aliphatic aldehyde derivative of a Schiff's base, which comprises combining sulphur dioxide with said aliphatic aldehyde derivative of a Schiff's base at a temperature of approximately 30 to 60° C. and treating the product thus formed with an acid at a temperature of approximately 50 to 70° C.

12. The process of preparing a mineral acid derivative of a reaction product of sulphur dioxide and an aliphatic aldehyde derivative of a Schiff's base, which comprises combining sulphur dioxide with said aliphatic aldehyde derivative of a Schiff's base at a temperature of approximately 30 to 60° C. and treating the product thus formed with a mineral acid at a temperature of approximately 50 to 70° C.

13. The process of preparing a sulphuric acid derivative of a reaction product of sulphur dioxide and a material formed by reacting an aliphatic aldehyde containing less than eight carbon atoms with a primary aromatic amine, which comprises combining sulphur dioxide with said aldehyde-amine product at a temperature of approximately 30 to 60° C. and treating the product thus formed with sulphuric acid at a temperature of approximately 50 to 70° C.

14. The process of preparing a sulphuric acid derivative of a reaction product of sulphur dioxide and a material formed by reacting substantially three molecular proportions of acetaldehyde with substantially two molecular proportions of aniline, which comprises combining sulphur dioxide with said acetaldehyde-aniline product at a temperature of approximately 30 to 60° C. and treating the product thus formed with sulphuric acid at a temperature of approximately 50 to 70° C.

15. The process of preparing the product formed by reacting substantially one-half a molecular proportion of sulphur dioxide with substantially one molecular proportion of the reaction product of substantially three molecular proportions of acetaldehyde and substantially two molecular proportions of aniline and further reacting the product thus formed with substantially one molecular proportion of sulphuric acid, which comprises combining said sulphur dioxide with said acetaldehyde-aniline product at a temperature of approximately 30 to 60° C. and treating the product thus formed with said sulphuric acid at a temperature of approximately 50 to 70° C.

16. The product formed by reacting substantially one-half a molecular proportion of sulphur dioxide with substantially one molecular proportion of the reaction product of substantially three molecular proportions of acetaldehyde and substantially two molecular proportions of aniline at a temperature of approximately 30 to 60° C. and further reacting the product thus formed with substantially one molecular proportion of sulphuric acid at a temperature of approximately 50 to 70° C.

17. The product formed by reacting in the presence of acetone substantially one-half a molecular proportion of sulphur dioxide with substantially one molecular proportion of the reaction product of substantially three molecular proportions of acetaldehyde and substantially two molecular proportions of aniline at a temperature of approximately 30 to 60° C. and further reacting the product thus formed with substantially one molecular proportion of substantially 75 per cent sulphuric acid at a temperature of approximately 50 to 70° C.

18. The process of preparing the product formed by reacting substantially one-half a molecular proportion of sulphur dioxide with substantially one molecular proportion of the reaction product of substantially three molecular proportions of acetaldehyde and substantially two molecular proportions of aniline and further reacting the product thus formed with substantially one molecular proportion of substantially 75 per cent sulphuric acid, which comprises combining said sulphur dioxide with said acetaldehyde-aniline product in the presence of acetone at a temperature of approximately 30 to 60° C. and treating the product thus formed with said sulphuric acid of substantially 75 per cent acid strength at a temperature of approximately 50 to 70° C.

DEAL H. TOMPKINS.